US012388865B2

(12) United States Patent
Sopan

(10) Patent No.: US 12,388,865 B2
(45) Date of Patent: Aug. 12, 2025

(54) SYSTEM AND METHOD FOR SURFACING CYBER-SECURITY THREATS WITH A SELF-LEARNING RECOMMENDATION ENGINE

(71) Applicant: Google LLC, Mountain View, CA (US)

(72) Inventor: Awalin Nabila Sopan, Reston, VA (US)

(73) Assignee: GOOGLE LLC, Mountain View, CA (US)

( * ) Notice: Subject to any disclaimer, the term of this patent is extended or adjusted under 35 U.S.C. 154(b) by 298 days.

(21) Appl. No.: 18/305,898

(22) Filed: Apr. 24, 2023

(65) Prior Publication Data

US 2023/0336586 A1  Oct. 19, 2023

Related U.S. Application Data

(63) Continuation of application No. 16/588,967, filed on Sep. 30, 2019, now Pat. No. 11,637,862.

(51) Int. Cl.
*H04L 9/40* (2022.01)
*G06F 11/32* (2006.01)
(Continued)

(52) U.S. Cl.
CPC ........ *H04L 63/1466* (2013.01); *G06F 11/327* (2013.01); *G06F 18/24* (2023.01); *G06N 20/00* (2019.01)

(58) Field of Classification Search
CPC ............. H04L 63/1466; H04L 63/1416; H04L 63/1425; H04L 63/1433; G06N 20/00; G06N 5/025; G06F 18/24; G06F 11/327
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| CN | 112567367 | 3/2019 |
| EP | 2990984 | 3/2016 |

(Continued)

OTHER PUBLICATIONS

Abdullah et al., "Visualizing Network Data for Intrusion Detection.", 2005 Institute of Electrical and Electronics Engineers Workshop on Information Assurance and Security, United States Military Academy, West Point, New York, United States, pp. 100-108.

(Continued)

*Primary Examiner* — Sarah Su
(74) *Attorney, Agent, or Firm* — DORITY & MANNING P.A.

(57) ABSTRACT

Techniques for performing cyber-security alert analysis and prioritization according to machine learning employing a predictive model to implement a self-learning feedback loop. The system implements a method generating the predictive model associated with alert classifications and/or actions which automatically generated, or manually selected by cyber-security analysts. The predictive model is used to determine a priority for display to the cyber-security analyst and to obtain the input of the cyber-security analyst to improve the predictive model. Thereby the method implements a self-learning feedback loop to receive cyber-security alerts and mitigate the cyberthreats represented in the cybersecurity alerts.

20 Claims, 3 Drawing Sheets

(51) Int. Cl.
  *G06F 18/24*  (2023.01)
  *G06N 20/00*  (2019.01)

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Babl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |

(56) References Cited

U.S. PATENT DOCUMENTS

| | | | |
|---|---|---|---|
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,870,298 B2 * | 1/2018 | Jackson .............. G06F 11/3433 |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,911,319 B2 * | 3/2018 | Malhotra .............. G08B 29/185 |
| 9,912,644 B2 | 3/2018 | Cunningham |
| 9,912,681 B1 | 3/2018 | Ismael et al. |

(56) References Cited

U.S. PATENT DOCUMENTS

| | | |
|---|---|---|
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,953,185 B2 * | 4/2018 | Bendersky ............ G06F 16/435 |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Evada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,567,402 B1 | 2/2020 | Comeaux et al. |
| 11,017,321 B1 * | 5/2021 | Mishra ............... G05B 23/0283 |
| 11,637,862 B1 * | 4/2023 | Sopan .................... G06N 5/025 |
| | | 726/23 |
| 11,870,799 B1 * | 1/2024 | Imrem .................. H04L 63/102 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Paletta et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Deikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhaf et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |

(56) References Cited

U.S. PATENT DOCUMENTS

| | | |
|---|---|---|
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | Fitzgerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Liang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Pao et al. |
| 2010/0030996 A1 | 2/2010 | Butler, II |
| 2010/0031353 A1 | 2/2010 | Thomas et al. |
| 2010/0037314 A1 | 2/2010 | Derdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |

(56) References Cited

U.S. PATENT DOCUMENTS

| | | |
|---|---|---|
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Padden et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0163242 A1* | 6/2015 | Laidlaw .............. H04L 63/1425 726/22 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0063901 A1 | 3/2017 | Muddu et al. |
| 2017/0083703 A1 | 3/2017 | Abbasi et al. |
| 2017/0243133 A1* | 8/2017 | Zavesky ................ G06N 20/00 |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0150758 A1 | 5/2018 | Niininen |
| 2018/0288077 A1 | 10/2018 | Siddiqui et al. |
| 2018/0367561 A1 | 12/2018 | Givental et al. |
| 2019/0020667 A1 | 1/2019 | Parker |
| 2019/0236458 A1* | 8/2019 | Taylor ..................... G06F 17/17 |
| 2019/0260779 A1* | 8/2019 | Bazalgette ............ H04L 51/224 |
| 2019/0334849 A1 | 10/2019 | Bostick et al. |
| 2020/0145358 A1 | 5/2020 | Yegorin et al. |
| 2020/0151326 A1* | 5/2020 | Patrich ................. G06F 21/554 |
| 2020/0401696 A1 | 12/2020 | Ringlein et al. |
| 2021/0058357 A1 | 2/2021 | Baughman et al. |
| 2022/0174088 A1* | 6/2022 | Zorlular ................. H04L 41/22 |

FOREIGN PATENT DOCUMENTS

| | | |
|---|---|---|
| GB | 2439806 | 1/2008 |
| GB | 2490431 | 10/2012 |
| GB | 2520987 | 6/2015 |
| WO | WO 0206928 | 1/2002 |
| WO | WO 0223805 | 3/2002 |
| WO | WO 2007117636 | 10/2007 |
| WO | WO 2008041950 | 4/2008 |
| WO | WO 2011084431 | 7/2011 |
| WO | WO 2011112348 | 9/2011 |
| WO | WO 2012075336 | 6/2012 |
| WO | WO 2012145066 | 10/2012 |
| WO | WO 2013067505 | 5/2013 |
| WO | WO-2018126286 A1 * | 7/2018 ............. G06N 20/00 |

OTHER PUBLICATIONS

Adetoye et al., "Network Intrusion Detection & Response System.", Adetoye, Sep. 2003.

Apostolopoulos, "V-eM: A cluster of Virtual Machines for Robust, Detailed, and High-Performance Network Emulation.", Fourteenth Institute of Electrical and Electronics Engineers International Symposium on Modeling, Analysis, and Simulation of Computer and Telecommunication Systems, Sep. 11-14, 2006, pp. 117-126.

Aura et al., "Scanning Electronic Documents for Personally Identifiable Information.", WPES '06: Fifth Association for Computing Machinery Workshop on Privacy in Electronic Society, Alexandria, Virginia, United States, Oct. 30, 2006, pp. 41-50.

Baecher et al., "The Nepenthes Platform: An Efficient Approach to Collect Malware.", RAID '06: Ninth International Symposium on

(56) References Cited

OTHER PUBLICATIONS

Recent Advances in Intrusion Detection, Hamburg, Germany, Sep. 20-22, 2006, pp. 165-184.
Bayer et al., "Dynamic Analysis of Malicious Code.", Journal in Computer Virology, vol. 2, Nov. 2006, pp. 67-77.
Boubalos, "Extracting Syslog Data Out of Raw PCAP Dumps.", seclists.org, retrieved on Aug. 8, 2023, Honeypots Mailing List Archives, https://seclists.org/honeypots/2003/q2/319, Jun. 5, 2003, pages.
Chaudet, et al., "Optimal Positioning of Active and Passive Monitoring Devices.", CoNEXT '05: 2005 Association for Computing Machinery Conference on Emerging Network Experiment and Technology, Toulouse, France, Oct. 24-27, 2005, pp. 71-82.
Chen et al., "When Virtual is Better Than Real.", Eighth Workshop on Hot Topics in Operating Systems, Elmau, Germany, May 20-22, 2001, 6 pages.
Christodorescu et al., "Mining Specifications of Malicious Behavior.", ESEC-FSE '07: Sixth Joint Meeting of the European Software Engineering Conference and the ACM SIGSOFT Symposium on the Foundations of Software Engineering, Dubrovnik, Croatia, Sep. 3-7, 2007, pp. 5-14.
Cisco, "Intrusion Prevention for the Cisco ASA 5500-x Series.", Data Sheet 2012.
Cohen, "PyFlag—An Advanced Network Forensic Framework.", Digital Investigation: The International Journal of Digital Forensics & Incident Response, vol. 5, Sep. 2008, pp. S112-S120.
Costa et al., "Vigilante: End-to-End Containment of Internet Worms.", Association for Computing Machinery Transactions on Computer Systems, vol. 26, No. 4, Article 9, Dec. 2008, 68 pages.
Distler, "Malware Analysis: An Introduction.", SANS Institute InfoSec Reading Room, SANS Institute, Feb. 12, 2008, 67 pages.
Dunlap et al., "ReVirt: Enabling Intrusion Analysis through Virtual-Machine Logging and Replay.", Fifth Symposium on Operating Systems Design and Implementation, OSDI '02 Fifth Symposium on Operating Systems Design and Implementation, USENIX Association, Boston, Massachusetts, United States, Dec. 9-11, 2002, 14 pages.
FireEye, "Malware Analysis.", Modern Malware Forensics, FireEye Inc., 2010.
FireEye.com, "FireEye Malware Analysis & Exchange Network, Malware Protection System.", Feb. 2010, chrome-extension://efaidnbmnnnibpcajpcglclefindmkaj/https://people.ucsc.edu/~warner/fireeye.pdf, retrieved on Sep. 19, 2023, 2 pages.
Goel et al., "Reconstructing System State for Intrusion Analysis.", Apr. 2008 Special Interest Group on Operating Systems Review, vol. 42, Issue 3, Apr. 2008, pp. 21-28.
Idika et al., "A Survey of Malware Detection Techniques.", Department of Computer Science, Purdue University, Feb. 2, 2007, 48 pages.
Keizer, "Microsoft's HoneyMonkeys Show Patching Windows Works.", Aug. 8, 2005, https://www.informationweek.com/it-life/microsofts-honeymonkeys-show-patching-windows-works#, retrieved Jun. 1, 2006, 4 pages.
Kim et al., "Autograph: Toward Automated, Distributed Worm Signature Detection.", Thirteenth USENIX Security Symposium, San Diego, California, United States, Aug. 9-13, 2004, pp. 271-286.
King et al., "Operating System Support for Virtual Machines.", 2003 USENIX Annual Technical Conference, San Antonio, Texas, United States, Jun. 9-14, 2003, 15 pages.
Kreibich et al., "Honeycomb-Creating Intrusion Detection Signatures Using Honeypots.", ACM SIGCOMM Computer Communication Review, vol. 34, Issue 1, Jan. 2004, pp. 51-56.
Kristoff, "Botnets, Detection and Mitigation: DNS-Based Techniques.", Security Day, 2005, 23 pages.
Lastline Labs, "The Threat of Evasive Malware.", Feb. 25, 2013, Lastline Labs, pp. 1-8.

Li et al., "A VMM-Based System Call Interposition Framework for Program Monitoring.", Institute of Electrical and Electronics Engineers Sixteenth International Conference on Parallel and Distributed Systems, Shanghai, China, Dec. 2010, pp. 706-711.
Lindorfer et al., "Detecting Environment-Sensitive Malware.", RAID 2011: Fourteenth International Symposium on Recent Advances in Intrusion Detection, Menlo Park, California, United States, Sep. 20-21, 2011.
Marchette, "Computer Intrusion Detection and Network Monitoring: A Statistical Viewpoint.", 2001.
Moore et al., "Internet Quarantine: Requirements for Containing Self-Propagating Code.", IEEE INFOCOM 2003: Twenty-second Annual Joint Conference of the Institute of Electrical and Electronics Engineers Computer and Communications Societies, San Francisco, California, United States, Mar. 30-Apr. 3, 2003, pp. 1901-1910.
Morales et al., "Analyzing and Exploiting Network Behaviors of Malware.", Security and Privacy in Communication Networks. Springer Berlin Heidelberg, 2010, pp. 20-34.
Mori, "Detecting Unknown Computer Viruses.", 2004, Springer-Verlag Berlin Heidelberg.
Natvig, "Sandboxii: Internet.", Virus Bulletin Conference 2001, Sep. 2002, 18 pages.
NetBIOS Working Group, "Protocol Standard for a NetBIOS Service on a TCP/UDP Transport: Concepts and Methods.", STD 19, RFC 1001, Mar. 1987.
"Network Security NetDetector-Network Intrusion Forensic System (NIFS).", NetDetector Whitepaper, 2003, 11 pages.
Newsome et al., "Dynamic Taint Analysis for Automatic Detection, Analysis, and Signature Generation of Exploits on Commodity Software.", Twelfth Annual Network and Distributed System Security Symposium (NDSS '05), San Diego, California, United States, Feb. 2-4, 2005, 17 pages.
Nojiri et al., "Cooperation Response Strategies for Large Scale Attack Mitigation.", DARPA Information Survivability Conference and Exposition, vol. 1, Apr. 22-24, 2003, pp. 293-302.
Oberheide et al., "CloudAV: N-Version Antivirus in the Network Cloud.", Seventeenth USENIX Security Symposium USENIX Security '08 Jul. 28-Aug. 1, 2008, San Jose, California, United States, 20 pages.
Ptacek et al., "Insertion, Evasion, and Denial of Service: Eluding Network Intrusion Detection.", Secure Networks, Jan. 1998, 63 pages.
Roundy et al., "Hybrid Analysis and Control of Malware.", RAID 2010: Thirteenth International Symposium Recent Advances in Intrusion Detection, Ottawa, Ontario, Canada, Sep. 15-17, 2010, pp. 317-338.
Sailer et al., "sHype: Secure Hypervisor Approach to Trusted Virtualized Systems.", IBM Research Division, Feb. 2, 2005, 13 pages.
Salah et al., "Using Cloud Computing to Implement a Security Overlay Network.", Institute of Electrical and Electronics Engineers Security and Privacy Magazine, vol. 11, No. 1, Jan. 2013, pp. 44-53.
Shinotsuka, "Malware Authors Using New Techniques to Evade Automated Threat Analysis Systems.", Oct. 26, 2012, http://www.symantec.com/connect/blogs/, pp. 1-4.
Silicon Defense, "Worm Containment in the Internal Network.", Mar. 2003, pp. 1-25.
Singh et al., "Automated Worm Fingerprinting.", Proceedings of the ACM/USENIX Symposium on Operating System Design and Implementation, San Francisco, California, United States, Dec. 2004.
Stevens, "Malicious PDF Documents Explained.", Security & Privacy, Institute of Electrical and Electronics Engineers Security & Privacy, vol. 9, No. 1, Jan.-Feb. 2011, pp. 80-82.
Yin et al., "Panorama: Capturing System-Wide Information Flow for Malware Detection and Analysis.", CCS '07: Fourteenth ACM Conference on Computer and Communications Security, Oct. 29-Nov. 2, 2007, Alexandria, Virginia, United States, pp. 116-127.

* cited by examiner

SYSTEM AND METHOD FOR SURFACING CYBER-SECURITY THREATS WITH A SELF-LEARNING RECOMMENDATION ENGINE

PRIORITY CLAIM

The present application is a continuation of U.S. application Ser. No. 16/588,967 having a filing date of Sep. 30, 2019, now U.S. Pat. No. 11,637,862. Applicant claims priority to and the benefit of each of such applications and incorporate all such applications herein by reference in its entirety.

FIELD OF THE INVENTION

The present disclosure relates, generally, to cyber-security and more specifically to techniques to facilitate the analysis and remediation of cyberattacks.

BACKGROUND

Cyber-security threats are a major risk to enterprises and individuals alike. Enterprises rely on security operations centers ("SOC") and the analysts operating SOCs, to identify, respond to, and mitigate the consequences of cyber-security threats targeting the enterprise's systems. SOC analysts are inundated with cyber-security alerts received from a variety of cyber-security products deployed to protect an enterprise. To reduce the vast volume of alerts to be addressed by SOC analysts, some SOCs filter alerts (e.g., for duplicates, known false positives, and low priority alerts, etc.) before they are presented to a SOC analyst.

BRIEF DESCRIPTION OF THE FIGURES

Embodiments of the disclosure are illustrated by way of example and not by way of limitation in the figures of the accompanying drawings, in which like references indicate similar elements and in which.

DETAILED DESCRIPTION

Figure 1:
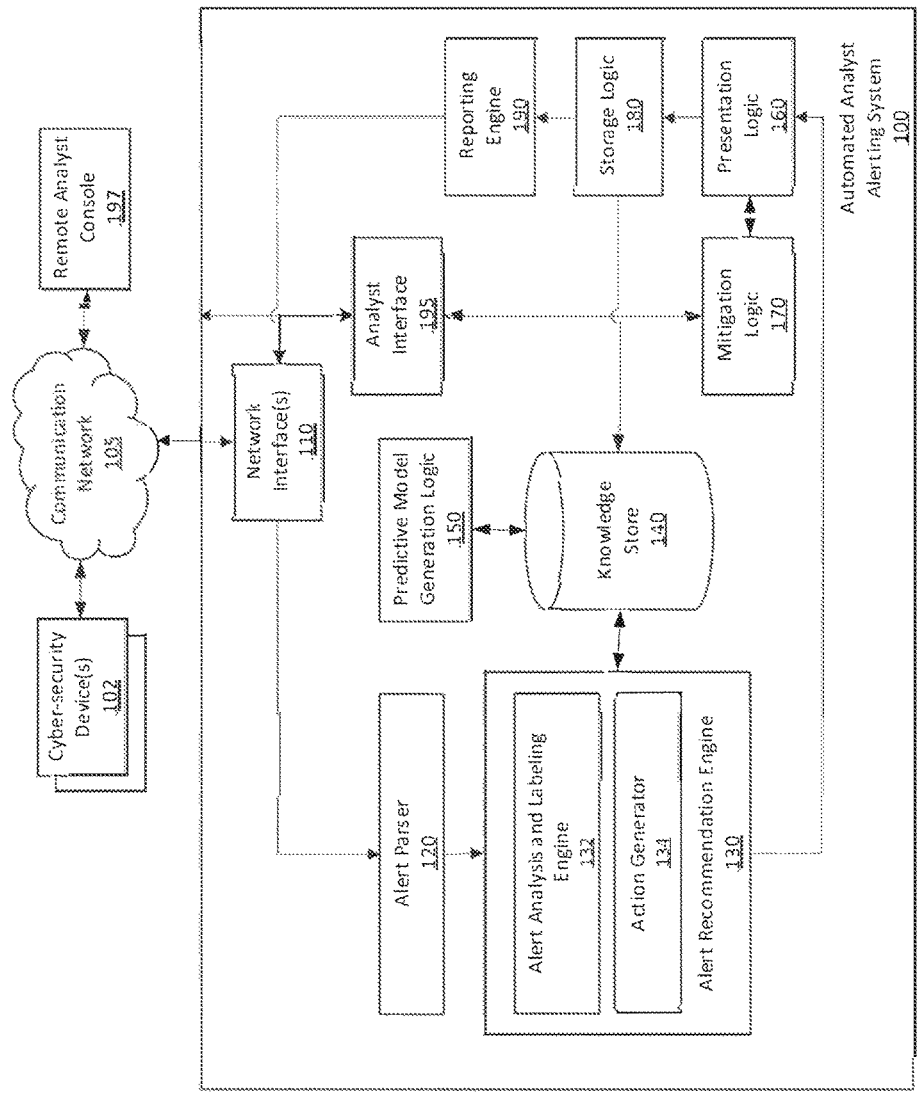
FIG. 1 is an exemplary block diagram of an automated analyst alerting system communicatively coupled to one or more cyber-security devices via a communication network, in accordance with an embodiment of the invention.

The detailed description below, describes a technology wherein a cyber-security automated analyst alerting system receives one or more cyber-security alerts, the alerts are analyzed by an alert recommendation engine which automatically determines a recommended course of action related to the one or more received cyber-security alerts by application of a predictive machine learning model generated by a predictive machine learning logic (or predictive model generation logic). The predictive machine learning logic generates a machine learning model (or more simply, "model"), for use by the alert recommendation engine, in response to changes in a knowledge store. More specifically, to automatically determine a recommended course of action (i.e. a set of one or more instructions, or commands, issued by the described system to mitigate a cyber-security threat), the alert analysis and labeling engine generates a modified alert including at least one classification, classification confidence level, and contextual data for each alert according to the predictive machine learning model, to create a modified alert which are provided to the action generator. The action generator (or in some embodiments through the execution of an engine processing a separate action predictive machine learning model) determines a recommended course of action according to the predictive machine learning model and generates a signal through a reporting logic to present the modified alert for display to an analyst.

More specifically, the automated analyst alerting system ("AAAS") is configured to receive an alert (the received alert is received from one or more alert-generating cyber-security devices), analyze the alert according to a model generated by a machine learning procedure applied to data in a knowledge store. The knowledge store includes data that associates previously detected alerts, cyber-security threats, and undesirable computing device configurations with one or more classifications as determined by a cyber-security analyst. Such classifications may include labels (e.g., "malicious", "non-malicious", "phishing", "misconfiguration", etc.) and a confidence level associated with the classification. For example, a received cyber-security alert received by the system and analyzed by the AAAS may classify the alert as "malicious" with a 17% confidence level, "non-malicious" with an 89% confidence level, and "misconfiguration" with a 91% confidence level. The classifications and their associated confidence levels are provided with the received alert, as well as with additional context related to the received alert, to create a modified alert and are provided to an action generator. The additional context may be based on prior selections of analysts, the prior selections stored in a knowledge store, and/or prior selections made by an expert system configured to make recommended actions based on associated received alerts. The knowledge store may be located locally and/or remotely via a network connection. In some embodiments the additional context may include information generated by the AAAS identifying a set of prior alerts (e.g., stored in the knowledge store) as being associated with a received alert and thereby identifying an advanced persistent cyber-security threat (i.e. a prolonged and targeted cyberattack in which an intruder may repeatedly attempt to gain access to a targeted network, computing device or user thereof). Based on the persistent cyber-security threat, the AAAS may modify the classifications and/or further classify the received alert as associated with the persistent cyber-security threat.

The predictive machine learning logic is configured to generate a predictive model based on data stored in the knowledge store. The data stored in the knowledge store may include the classifications associated with alerts that were previously received and classified (confirmed or reclassified) by cyber-security analysts. The knowledge store may also store mitigative actions selected by and/or input by a cyber-security analyst. The knowledge store may also be used to store meta-information associated with the success or failure of automated or manually selected mitigations and consequently create a self-learning feedback loop. The self-learning feedback loop surfaces classifications and actions for the cyber-security analysts.

The predictive machine learning logic may be co-located with the alert recommendation engine and/or remotely located. The predictive machine learning logic generates a predictive model according to conventional machine learning techniques (e.g., support vector machines, artificial neural networks, etc.) applied to the data stored in the knowledge store, in a process known as "training". The training system may include information extracted from received alerts and stored as data in the knowledge store. The information extracted from the received alert may include received alert message content as well as well as meta-information associated with the received alert (e.g., time of receipt, IP address of the source cyber-security device, etc.). The training system may also include information associated with the received alert (e.g., modifying a label associated with alert or associating a course of action with the alert) by the cyber-security analyst and stored in the knowledge store. Based on information stored in the knowledge store, the predictive machine learning logic may generate the predictive model which, when applied to a received alert, may be used to classify and determine one or more courses of action related to the received alert using machine learning.

In some embodiments, the generated predictive model may be used by one or more classifiers to determine a probability of the accuracy (i.e. confidence level) of a label for each alert. The classifiers may classify each alert based on a label as determined by an analyst and/or the alert recommendation engine according to the predictive model. In some embodiments, analysts may select from a predefined set of labels, whereas, in other embodiments, labeling may be done automatically. A classifier may generate a probability of association with a label relating to each received alert.

Upon receipt of new data in the knowledge store, or periodically or aperiodically to account for any such newly stored data, the predictive machine learning logic generates a new predictive model by analyzing the data to determine associative relationships. In some embodiments, the application of a predictive model to a received alert may generate one or more labels and/or courses of actions, each associated with a confidence level. The confidence levels are correlated with a likelihood of the alert being associated with the label and/or course of action. The newly generated predictive model may be based on additional data—e.g., verification of a prior classification (e.g., of a classification made by the alert recommendation engine and, in some embodiments confirmed by the analyst), newly associated courses of actions (i.e. mitigative actions responsive to a received alert), where the association may be made automatically or made or confirmed by an analyst, and/or new information associated with alert classification provided to the knowledge store via an update mechanism. The newly generated predictive model is applied to newly received alerts by the alert recommendation engine for classification, thereby creating a self-learning feedback loop. The classification is responsive to the labels resulting from application of the predictive model to the received alert.

The action generator receives the modified alerts and associated context information to determine a recommended course of action for presentation via the reporting logic. The action generator determines a recommended course of action based on the application of a predictive model generated by the predictive model generation logic. The received modified alerts are analyzed by the action generator to determine a priority for presentation to an analyst. To determine a priority associated with the modified alert, the action generator may analyze the confidence levels (e.g., associated with a course of action determined by application of the predictive model, associated with a classification label, etc.). The priority assigned to a received alert may be based, at least in part, on a numerical distance of the confidence level a threshold, such as, for example, an automated execution threshold. For example, if the confidence associated with an action is 55% and the confidence threshold for automated execution of an action is 90%, the action generator may determine that the confidence associated with an action is too far from the threshold to be automatically actionable and should be displayed to an analyst and therefore given a higher priority for the analyst's attention. Similarly, if the confidence if the confidence associated with an action is 85% and the confidence threshold for automated execution of an action remains 90%, the action generator may determine that the confidence associated with an action is near the threshold, however, because it is not above the automatically actionable threshold, the received alert should be displayed to an analyst and therefore given a lesser priority than in the prior example. If a cyber-security threat or serious configuration issue requiring mitigation is detected (e.g., based on a classification and/or course of action), the action generator may determine whether the mitigation requires analyst attention (e.g., for selection) or if a recommended course of action may be automatically processed. To determine if analyst attention is required, the action generator determines if a course of action from the knowledge store and/or the expert system is applicable. A course of action is applicable if the action generator determines a level of correlation (i.e. confidence level) between a course of action and the modified alert exceeds a confidence threshold. If a course of action is automatically executed and fails to resolve the alert, the system may provide the modified alert associated with the failed action to the reporting logic for display to the analyst. If the action generator receives an alert associated with a persistent cyber-security threat, it may assign a priority to the modified alert and provide the priority to the presentation logic for display to an analyst. The action generator provides a further modified alert, the further modified alert combining the modified alert received by the action generator with the resulting course of actions, if applicable.

The further modified alert is provided to the presentation logic for layout composition. A layout is the way in which the modified alerts are composed for further review by the analyst. In some embodiments the layout may be composed for presentation to an analyst, in different layouts, according to the analyst's role. In some embodiments the modified alert may be presented to the analyst in different windows or otherwise highlighted, according to the assigned priority.

The presentation logic receives the further modified alert to determine if the further modified alert is to be presented to an analyst for further review. The presentation logic may determine, based on the assigned priority of the further modified alert, to present the further modified alert to a cyber-security analyst. The presentation logic may determine, that a further modified alert shall not be presented to the cyber-security analyst due the relative priority (e.g., lesser) compared to other further modified alerts presented to the analyst at the same time. The relative priority of a further modified alert may increase (or decrease) based on selections made by a cyber-security analyst (e.g., as an analyst processes and addresses a first further modified alert, the relative priority of other further modified alerts may increase and be presented to the analyst).

The presentation logic may also process the course of action data included in the further modified alert to determine if a course of action may be automatically executed. A course of action to be automatically executed may be identified by the further modified alert. Automatic execution of the course of action may require communication with a conventional external computing device that is configured to effectuate the course of action (e.g., a firewall, switch, server or endpoint system) connected to the network via the network interface. The mitigation logic receives a course of action for processing, the course of action may be received via the presentation logic if automatically selected or via an analyst interface when selected by an analyst. The mitigation logic initiates an external computing device (e.g., a cyber-security device, etc.) to execute a mitigation (i.e. via a course of action) sent by the mitigation logic.

More specifically, the mitigation logic processes the course of action received and launches processes based on the course of action. The executed course of action includes at least one process to be executed. Some processes to be executed as a course of action may require communication with one or more external computing devices through an interface (e.g., API calls to external computing devices, etc.). In some embodiments, courses of action may include more than one process, each process may be required by the course of action to be processed in series or parallel (in a temporally overlapping manner). A process may be required to be executed in series if the output of a first process is required as input of a subsequent process. If a process of the course of action executed does not process successfully, an alert may be generated by the mitigation logic and provided to the presentation logic for display to the cyber-security analyst. For example, a course of action may require a process A and a process B to operate in series. Process A may include the execution of an API call to a network connected firewall requesting the status of port 8081, while Process B executes a process receiving the status, and if the status is "open", executes an API call to the network connected firewall to close port 8081. Based on the success of the execution of the processes of the course of action, the mitigation logic communicates to the presentation logic. In some embodiments, the mitigation logic may provide an error message to the presentation logic, describing the nature of the failure if the course of action did not successfully complete. The meta-information associated with the processing by the mitigation logic (e.g., error messages, process success or failure, course of action success or failure, etc.) is provided in the form of an execution message. The mitigation logic may be configured to automatically, manually, or semi-automatically process courses of action.

The presentation logic receives data associated with the processing of a course of action by the mitigation logic (i.e. an execution message), via the mitigation logic. The data included in the received execution message is associated with the further modified alert and a determination is made by the presentation logic to present to an analyst. For example, the analyst may be provided a notification of a successful (or failed) execution of a course of action. In some embodiments an analyst may be presented with an alert describing the failed execution of a course of action as well as the associated further modified alert. The presentation logic provides the further modified alert to the storage logic for further processing.

The storage logic receives the further modified alert, from the presentation logic, and the associated execution message, and determines if the content received (e.g., the data associated with the further modified alert obtained from the execution message) should be stored in the knowledge store. The further modified alert may contain information about selections and results of course of action selected by an analyst and/or automatically selected by the presentation logic. The storage logic may parse the further modified alert to extract the selection of a course of action by an analyst to store in the knowledge store. In some embodiments, the storage logic may determine that a selected course of action need not be stored in the knowledge store based on the success and/or failure of the course of action. In some other embodiments an execution message may be received directly from the mitigation logic, instead of being received via the presentation logic. Once processed by the storage logic, the presentation alert is provided to the reporting engine for display to the analyst.

The reporting logic is configured to provide reports via an interface to an analyst and/or a system administrator. The reporting logic may provide reports via an analyst interface and/or a network interface. The reporting logic generates the report for the analyst based on information provided by a received further modified alert. The reporting logic may be configured to generate discrete reports and/or dynamic interfaces for interaction by an analyst. The further modified alert to be displayed by the reporting interface, in combination with the system interface, may be displayed in addition to other further modified alerts that have been received by a dynamic interface. The analyst may interact with each further modified alert for analysis of the alert using additional information provided by the system and/or to select a course of action (which may also be included in the further modified alert). The interaction with the further modified alert may be received by an interface (e.g., a network interface and/or the analyst interface). The information received by the interface may be provided to the knowledge store via the storage logic. The information stored in the knowledge store is used by the predictive machine learning logic to generate a predictive model to implement a self-learning feedback loop. The self-learning feedback loop aids an analyst in efficiently addressing cyber-security alerts received by a cyber-security automated analyst alerting system.

Elements of the invention employ computerized techniques to generate machine learning models used to classify received alerts, initiate the display of classified received alerts, and re-generate the machine learning models in response to input receive from a cyber-security analyst responsive to the displayed classified received alert.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage. The term "computerized" generally represents that any corresponding operations are conducted by hardware in combination with software and/or firmware.

The term "transmission medium" (or "transmission media") may refer to a communication path between two or more systems (e.g. any electronic devices with data processing functionality such as, for example, a security appliance, server, mainframe, computer, netbook, tablet, smart phone, router, switch, bridge or router). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "alert" may refer to a signal or notification (e.g., report) received from, or issued by, a source. The alert conveys information regarding an event. An event may refer to an observed (or in some cases, inferred) occurrence that has significance to an associated alert type. An alert type may indicate an alert classification (e.g., an alert indicating a user login attempt may be classified as a "user alert"—i.e. an alert with a "user" type). A cyber-security event may be relevant to a cyber-threat. Relationships between events may be determined based on information provided by received cyber-security alerts describing events monitored by the cyber-security devices (or software). For example, a user-operated endpoint may be monitored by resident cyber-security software (e.g., an embedded agent), the software monitoring the execution of a process "opening" a file. An alert may be associated with, or triggered by, any of a variety of computing activities, for example: a granting or denial of administrative rights or escalation of privileges, an unauthorized access of an access-restricted compute device, detection of a new device on a restricted network, multiple different user login(s) made by a single compute device, an unexpected/unusual login of a user, detection of an internal vulnerability, etc.

The term "message" generally refers to signaling (wired or wireless) as either information placed in a prescribed format and transmitted in accordance with a suitable delivery protocol or information made accessible through a logical data structure such as an API. Hence, each message may be in the form of one or more packets, frame, or any other series of bits having the prescribed, structured format.

The term "object" generally refers to a collection of data, such as a group of related packets associated with a request-response message pairing for example, normally having a logical structure or organization that enables classification for purposes of analysis. For instance, an object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

The term "appliance" refers to any type of general-purpose or special-purpose computer, including a dedicated computing device, adapted to implement any variety of existing, or future, software architectures relating to detection of, and protection from, cyberattack and related functionality. The term appliance should therefore be taken broadly to include such arrangements, in addition to any systems or subsystems configured to support such functionality, whether implemented in one or more network computing devices or other electronic devices, equipment, systems or subsystems.

The terms "computer", "processor", "computer processor", "compute device", or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), a graphics processing unit (GPU), or any other electronic computing device comprising one or more processors of any kind, or any combination thereof.

As used herein, the phrase "for example," "such as", "for instance", and variants thereof describe non-limiting embodiments of the presently disclosed subject matter. Reference in the specification to "one case", "some cases", "other cases", or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. Architecture

Referring to FIG. 1, an exemplary block diagram of an automated analyst alerting system 100 is communicatively coupled, via a network interface 110, to at least one communication network 105. The communication network 105 may couple the automated analyst alerting system 100 with cyber-security devices 102 and/or a remote analyst console 197 via transmission media to exchange information with the communication network directly or via the Internet. The communication network 105 may be coupled directly or indirectly to cyber-security device(s) 102. The cyber-security devices 102 may operate within the same or different networks. Each cyber-security device represents a logical entity, operating on objects, to determine if they represent a cyber-security risk. In some embodiments a cyber-security device 102 may include a software application operating on a user operated endpoint device (e.g., a laptop, mobile phone, etc.) while in some other embodiments the cyber-security device may include a dedicated cyber-security appliance. The cyber-security device 102 may detect potential cyber-security threats and generate and issue a cyber-security alert. The cyber-security device 102 may be configured to direct issued alerts to the automated analyst alerting system 100.

The automated analyst alerting system 100 includes a network interface 110, an alert parser 120, an alert recommendation engine 130, a knowledge store 140, a predictive model generation logic 150, a presentation logic 160, a mitigation logic 170, a storage logic 180 a reporting engine 190 and an analyst interface 195. Upon receipt by the automated analyst alerting system 100 of an alert generated by a cyber-security device 102, via the network interface 110, the alert is provided to the alert parser 120. The alert parser 120 analyzes the received alert and normalizes the contents according to a set of normalization rules that normalize the received alert into a known alert format, comprehensible by the alert recommendation engine 130. In some embodiments the normalization rules may be user-defined (and/or user-modifiable). In some embodiments the alert parser may be updated with additional (modified) processing (normalizing) rules. Such updates may be received by the automated analyst alerting system 100 periodically or aperiodically via the network interface 110. The rule update may be processed by the alert parser 120 directly or via a separate logic (not shown).

The alert parser 120 provides the normalized alert to the alert recommendation engine 130 for further analysis. In some embodiments, the alert parser 120 may, limit further analysis of an alert based on contextual information. If a received alert received by the alert parser 120 includes a classification of the alert the alert parser may provide the alert recommendation engine 130 with the received alert classification and the alert recommendation engine 130 may include this classification (in some embodiments this classification may be added to the modified received alert without a confidence level). Contextual information may include data with respect to available system resources (e.g., processor load, memory availability, etc.), quality of alerts from particular cyber-security devices 120 (e.g., information related to reliability of cyber-security alerts in identifying cyberthreats associated with a particular cyber-security device), duplication (i.e. information that associates a set of alerts identifying identical alerts from cyber-security devices and associates them together for de-duplication by the various logics of the automated analyst alerting system), etc. Analysis of contextual information may be performed by the alert parser 120 by evaluating normalization rules by the alert parser 120. By reducing the number of received alerts to be analyzed by the automated analyst alerting system 100, the system may aid an analyst focus on high value alerts.

The alert recommendation engine 130 includes at least an alert analysis and labeling engine 132 and an action generator 134. The alert recommendation engine 130 receives, from the alert parser 120, an alert transformed according to the normalization rules and via the alert analysis and labeling engine 132, generates at least one label associated with the alert as well as a confidence level associated with each label. The action generator 134 of the alert recommendation engine 130 receives the label and associated confidence levels from the alert analysis and labeling engine 132 and determines if an action may be associated with the alert. The components of the alert recommendation engine 130 (i.e. the alert analysis and labeling engine 132 and the action generator 134) operate in concert with information provided by the knowledge store 140.

The knowledge store 140, operating in concert with the alert recommendation engine 130, provides information generated from the predictive model generation logic 150 and information received from analyst operation. The information provided to the knowledge store 140 may include, by non-limiting example, information associated with execution of mitigations by cyber-security device(s) 102, information associated with the result of instructed mitigations by cyber-security device(s), classification of a received alert by an analyst, etc. Additionally, in some embodiments, the knowledge store 140 may include the predictive model generated by the predictive model generation logic 150. In some embodiments the predictive model may be stored in a separate store (e.g., a store provided by the alert recommendation engine 130, etc.). In some embodiments, the knowledge store 140 may receive and store information, from the analyst, associated with a classification of a received alert (e.g., related alerts, identifiers associated with the alert, intelligence associated with a received alert, etc.).

The predictive model generation logic 150 may periodically or aperiodically generate a predictive model to be used by the alert recommendation engine 130. The predictive model generation logic may generate the predictive model in response to the receipt of a signal indicating new information has been stored in the knowledge store 140. In some embodiments, the predictive model generation logic 150 may only generate a new model in response to the receipt by the knowledge store 140 of information received from an analyst (e.g., a new alert classification, a modification and/or update to an existing classification, correction of a previously mis-classified alert, etc.). The predictive model generated by the predictive machine learning model 150 may be generated according to a known machine learning recommendation techniques. In some embodiments the predictive machine learning logic 150 may train a predictive model based on the labelled data stored in the knowledge store 140. In some embodiments, the predictive machine learning logic 150 may generate the predictive machine learning model "offline" (i.e., "out of band"). In some embodiments (not shown) the predictive machine learning logic 150 may be remotely located from the automated analyst alert system 100 and communicatively coupled, for example, via communication network 105, with cloud computing resources (not shown). The generated predictive model generates at least one classification and/or association of the classification with an alert. In some embodiments the classification generated by the predictive model may correspond to a numerical association with the classification. For example, based on analysis of the alert by the predictive model generated by the predictive model generation logic 150, an alert may be associated with (a) maliciousness (31% confidence level), (b) phishing (51% confidence level), and (c) benign (67% confidence level).

In some embodiments, the predictive model generation logic 150 may generate a predictive model associating mitigation actions ("actions") with identified classifications. In other embodiments, a separate logic (e.g., the action generator 134) may determine an action associated with identified classifications. A set of known actions may be stored in the knowledge store 140. In some embodiments, the analyst may generate (i.e. user-define) an action to be stored in the knowledge store. In certain embodiments, actions generated by an analyst, in response to an alert are automatically stored in the knowledge store 140.

The alert analysis and labeling engine 132 receives from the alert parser 120 the received alert for further analysis and obtains a predictive model from the knowledge store 140. The alert analysis and labeling engine 132 is configured to apply the obtained predictive model and apply the predictive model to the received alert. By applying the predictive model to the received alert the alert analysis and labeling engine 132 generates at least one classification label and confidence level. If a plurality of classification labels and levels of association of classifications are generated, the alert analysis and labeling engine 132 will determine a classification for the received alert. In some embodiments the alert analysis and labeling engine 132 may apply more than one classification to an alert. In some embodiments the classification determination of the alert analysis and labeling engine 132 may, by way of non-limiting example, include the classification corresponding to the highest confidence level, each classification where an associated level of classification exceeds a threshold, a classification associated with a level of classification exceeding a second threshold, higher than a first threshold, etc. In some embodiments the alert analysis and labeling engine 132 may provide the classification of the alert and the alert to the action generator 134 while in other embodiments, the alert analysis and labeling engine may provide the classification and the received alert directly to the presentation logic 160.

The action generator 134 is configured to analyze the received alerts and classification to determine if a known action may be recommended to a receiving analyst. In some embodiments, the predictive model generation logic 150 may generate a predictive action model, stored in the knowledge store 140. The predictive action model is adapted to, in combination with the action generator 134, associate a known action with a received alert. In other embodiments the action generator may be configured with a set of rules associating specified actions with selected alerts. For example, an alert received and classified by the alert analysis and labeling engine 132 as being associated with "phishing" may cause the action generator 134 to associate an action to the alert, the action, upon execution, quarantines the cyber-security device 102 associated with the alert (i.e. the computing device associated with the phishing alert). Rules to be processed by the action generator 134 may be factor-set, and/or user (e.g., security administrator, analyst, etc.) configurable. The action generator may rely on information processed by the alert parser 120 associated with affected devices protected by the automated analyst alerting system 100. In some embodiments the action generator 134 may identify an action associated with the alert to be automatically executed (e.g., not require execution approval from analyst). The action generator 134 may determine that no known (e.g., in the knowledge store 140, and/or in configured rules of the action generator) action may be associated with the received alert and classification. Once an alert is analyzed by the action generator 134, the alert is provided to the presentation logic 160.

The presentation logic 160 receives, from the alert recommendation engine 130, the received alert and associated classifications and actions. The presentation logic 160 determines if an associated action should be provided directly to the mitigation logic 170 or be presented to an analyst for determination. The presentation logic 160 may be configured to determine if and how an alert should be presented to an analyst by the reporting engine 190. The presentation logic 160 may determine an alert whose associated action is to be automatically executed by the mitigation logic 170 should be presented to the analyst despite its automated execution. In some embodiments the presentation logic 160 may generate a graphical user interface (GUI) for the reporting engine 190 to present to the analyst. The presentation logic 160 may receive results associated with the execution of an action by the mitigation logic 170 and/or instructions received from the analyst related to alerts that were presented to the analyst. The presentation logic 160 provides the received alert and associated results and/or analyst instruction to the storage logic 180.

The storage logic 180 determines if a received action, alert classification, or analyst instruction (e.g., action instruction, creation of a new action, etc.) should be stored in the knowledge store 140. The determination as to whether an action should be stored in the knowledge store 140 may be based on whether the action is duplicative (e.g., a similar action exists in the knowledge store), not in opposition to existing actions stored in the knowledge store, etc. In some embodiments, a modification to an existing action may be received by the storage logic 180 and the contents of the knowledge store 140 may be modified. If no action needs to be stored in the knowledge store 140 or if it has already been stored in the knowledge store, the received information is provided to the reporting engine 190 for presentation to the analyst.

The mitigation logic 170 receives from the presentation logic 160 actions for execution by cyber-security device(s) 102. The action generator 134 may identify, to the presentation logic 160 whether an action associated with an alert should be automatically executed by the mitigation logic. Similarly, the mitigation logic 170 may receive, via the network interface(s) 110, an action instruction from an analyst (e.g. via the analyst interface 195). The action instructed by the analyst to the mitigation logic 170 may be provided to the presentation logic 160 for further processing (as described above) and be further processed by the mitigation logic 170 for execution. The execution of actions by the mitigation logic 170 may be direct (e.g., an action which may be executed directly by the automated analyst system 100) or indirect (e.g., issuing instructions, via the network interface(s) 110 to cyber-security device(s) 102). In some embodiments the mitigation logic 170 may be configured with credentials for interaction with systems requiring authorization for executing cyber-security actions. The mitigation logic 170 may be configured to generate application programming interface (API) calls to cyber-security device(s) 102 in response to receiving an action for execution. In other embodiments an action may include the execution details and the mitigation logic 170 does not generate API calls to the cyber-security device(s) 102. The result of an execution is received by the mitigation logic 170 via the network interface(s) 110 and provided to the presentation logic 160.

The reporting engine 190 may be configured to generate an alert for transmission to an external display of an analyst. The reporting engine 190 may be configured to provide a GUI to the analyst display and/or other known display systems (e.g., command line terminal, etc.). The reporting engine 190 is configured to provide reports via the network interface(s) 110, for example, the remote analyst console 197. In some embodiments the reporting engine 190 may provide interactive alert which may allow an analyst to provide responsive instructions to the mitigation logic 170 for further processing by the automated analyst alerting system 100. The analyst may provide an interactive response and consume alerts via the remote analyst console 197.

Figure 2:
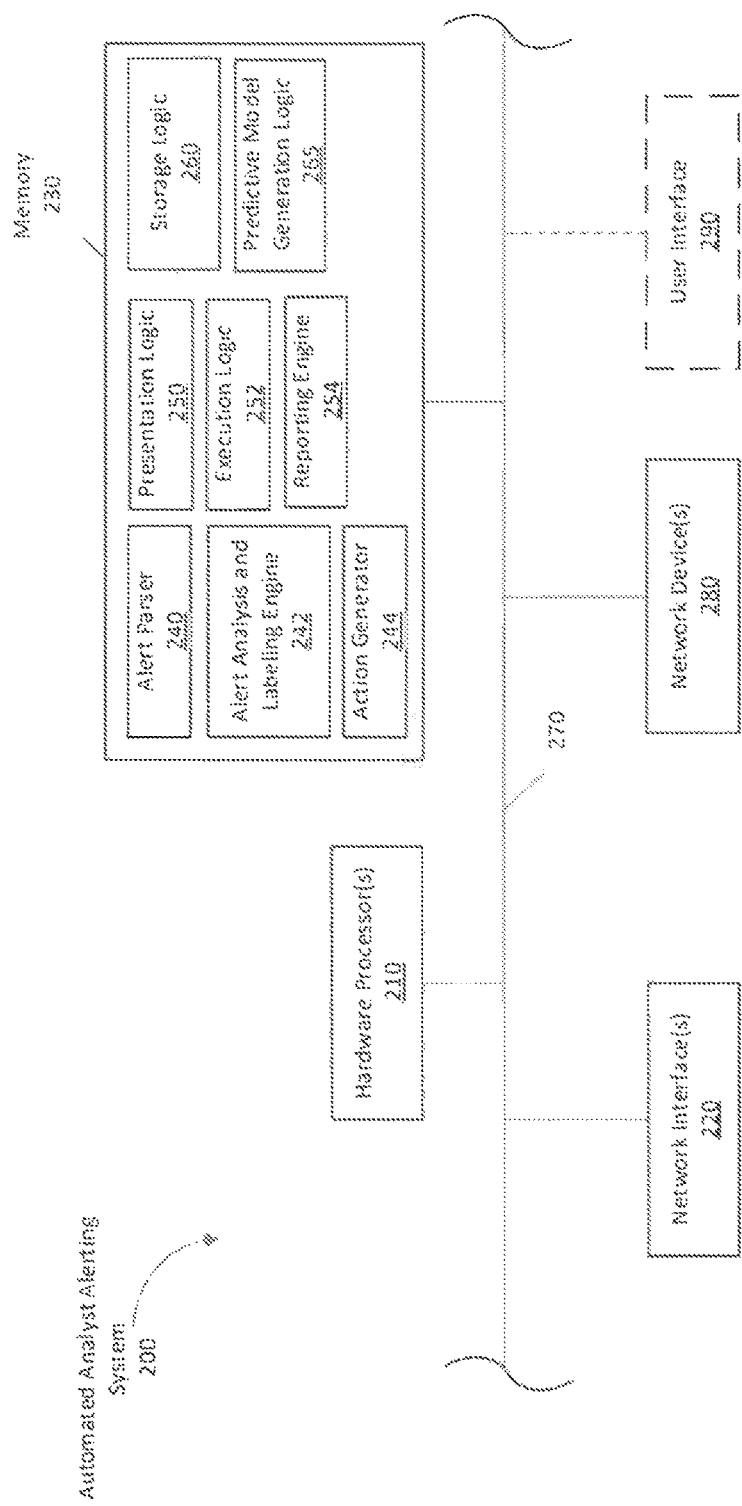
FIG. 2 illustrates a logical representation of the automated analyst alerting system of FIG. 1.

As illustrated in FIG. 2 in greater detail, the automated analyst recommendation system 200 has physical hardware including hardware processors 210, network interface(s) 220, a memory 230, a system interconnect 270, and optionally, a user interface 290. The memory 230 may contain software comprising an alert parser 240, an alert analysis and labeling engine 242, an action generator 244, presentation logic 250, a mitigation logic 252, a reporting engine 254, an storage logic 260, and a predictive model generation logic 265. The physical hardware (e.g. hardware processors 210, network interface(s) 220, memory 230) may be connected for communication by the system interconnect 270, such as a bus. Generally speaking, an automated analyst recommendation system 200 is a network-connected alert analysis system configured to enhance the operation of a security operations center (SOC) by providing a SOC analyst with relevant alerts and meta-information.

The hardware processor 210 is a multipurpose, programmable device that accepts digital data as input, processes the input data according to instructions stored in its memory, and provides results as output. One example of the hardware processor 210 is an Intel® microprocessor with its associated instruction set architecture, which is used as a central processing unit (CPU) of the automated analyst recommendation system 200. Alternatively, the hardware processor 210 may include another type of CPU, a digital signal processor (DSP), an application specific integrated circuit (ASIC), or the like.

The network device(s) 280 may include various input/output (I/O) or peripheral devices, such as a storage device, for example. One type of storage device may include a solid state drive (SSD) embodied as a flash storage device or other non-volatile, solid-state electronic device (e.g., drives based on storage class memory components). Another type of storage device may include a hard disk drive (HDD). Each network device 280 may include one or more network ports containing the mechanical, electrical and/or signaling circuitry needed to connect the automated analyst recommendation system 200 to the private network 120 to thereby facilitate communications over the communication network 105. To that end, the network interface(s) 220 may be configured to transmit and/or receive messages using a variety of communication protocols including, inter alia, TCP/IP and HTTPS.

The memory 230 may include a plurality of locations that are addressable by the hardware processor 210 and the network interface(s) 220 for storing software (including software applications) and data structures associated with such software. The hardware processor 210 is adapted to manipulate the stored data structures as well as execute the stored software, which includes an alert parser 240, an alert analysis and labeling engine 242, an action generator 244, presentation logic 250, an mitigation logic 252, a reporting engine 254, an storage logic 260, and a predictive model generation logic 265.

The alert parser 240 is a software application, operating on data (i.e. alerts) provided to the automated analyst recommendation system 200 via the network interface(s) 220 according to the description of alert parser 120 of FIG. 1. The alert parser 240 receives an alert and processes the alert according a set of normalization rules residing within the memory 230. The alerts processed by the alert parser 240 are provided to the alert analysis and labeling engine 242 for further processing.

The alert analysis and labeling engine 242 processes received alerts according to a generated predictive model stored in memory 230. The alert analysis and labeling engine generates a set of classifications in response to the processing of the received alert by the predictive model. The classifications may correspond to a set of labels applied to the received alert and to be used in further processing of the alert by other components of the automated analyst recommendation system 200. The classification labels generated by the alert analysis and labeling engine 242 may include a likelihood of association (i.e. confidence level) with the alert. The likelihood of association may be applied to the alert and provided, in addition to the associated classification label and alert, to the action generator 244. In some embodiments the alert analysis and labeling engine 242 may also generate a set of associated alerts related to the received alert. The association may result from the predictive model and/or be associated with correlating meta-information of the alert. The predictive model is generated by the predictive model generation logic 265.

The predictive model generation logic 265 generates predictive models and stores in the memory 230. In some embodiments the predictive model generation logic 265 may generate a separate second predictive action model (based on the actions previously associated with alerts and stored in the knowledge store 140) for use by the action generator 244, distinct and trained separately from the predictive model used by the alert analysis and labeling engine 242 (based on prior classifications of alerts and stored in the knowledge store 140). In other embodiments the predictive model generation logic may associate prior analyzed alerts with the received alert to determine if they are related and may need to be processed by the analyst together. If so, they may be associated together in meta-information and provided to the presentation logic 250. The predictive model generation logic 265 generates models based on information stored in memory 230 related to prior alerts and actions. The predictive model generation logic 265 analyzes stored information to generate a predictive model according to known machine learning techniques. A random forest classifier is an exemplary technique that creates a set of decision trees from randomly selected subset of training set. The random forest classifier then aggregates the decisions from the set of decision trees to decide the final classification associated with the targeted alert. In some embodiments an alternative technique may be used (e.g., convolutional neural networks, support vector machines, etc.). The generated predictive models are stored in memory 230 to be accessed by the analytic logics of the automated analyst recommendation system 200.

The action generator 244 receives from the alert analysis and labeling engine 242 the received alert and at least the classification label(s) determined by the alert analysis and labeling engine. The action generator 244 analyzes the received alert and classification and may determine an action which may be executed in response to the alert. The determined action may be an action recommended (to the analyst) to mitigate the cyber-security threat identified by the alert. In some embodiments the determined action may include instructions to obtain additional information regarding the alert (e.g., an instruction to the alert originating cyber-security device for additional meta-information related to the first alert). The action generator 244 may generate an action based on rules stored in memory 230 and/or based on model provided by the predictive model generation logic 265. The predictive model generation logic 265 may generation a predictive action model in response to storage in memory 230 of new actions. New actions may be stored in memory 230 based on an update action received by the automated analyst recommendation engine via the network interface(s) 220 and/or via analyst selecting a recommended action or submitting an action. The predictive action model is generated based on actions stored in memory 230. The action generator 244 may associate no actions or one or more actions in response to further analysis of the received alert and/or classification information (the classification information including the at least classification label and associated likelihood of association). In some embodiments the action generator 244 determines that a recommended action shall be executed without confirmation by the analyst and the action is labelled with such an indicator. Once the action generator 244 determines whether an action may be associated with the alert, the alert and any associated information is provided to the presentation logic 250.

The presentation logic 250 is provided with the alert from either the alert analysis and labeling engine 242 or the action generator 244 as well as with additional meta-information (e.g., recommended action(s), classification(s) and associated confidence levels) generated during prior processing for presentation to the analyst. If an action is labeled for automatic execution the action is provided to the mitigation logic 252 by the presentation logic 250. Similarly, if responsive to presentation to an analyst, the presentation logic 250 receives instructions from the analyst, the action instructed is provided to the mitigation logic 252 for processing. The presentation logic 250 may further analyze the alert and associated meta-information to determine a priority and arrangement of the alert and associated information to the analyst. For example, alerts associated with low confidence levels (e.g., the system cannot properly label the alert), may be assigned a higher priority and presented to the analyst. In some other embodiments, analysis of the meta-information associated with an alert may indicate duplicative alerts having been received, consequently, the presentation logic may generate a modified GUI to aggregate and/or filter the duplicative alerts to the analyst. In still yet other embodiments the presentation logic 250 may receive from the mitigation logic 252 the results of an executed action for presentation to the analyst and storage by the action logic 260. Upon receipt, the execution results are associated with the associated alert's meta-information and provided to storage logic 260.

The mitigation logic 252 receives action instructions via the presentation logic 250. Actions may be provided to the mitigation logic 252 automatically or in response to an instruction from an analyst. The action may require communication via the network interface(s) 220 to third party systems (e.g., cyber-security devices 102). Communication with third party systems may require authentication credentials for authorization, which may be configured by the security administrator and/or an analyst in advance of action execution or as needed. The mitigation logic 252 may also operate via the analyst alert recommendation system 200 directly. An action execution result may be generated upon receipt of results from an execution. In some embodiments, if no result response is received within a specified time period (e.g., 60 seconds) the mitigation logic may generate an action execution result indicating a "timeout". The results response is provided to the storage logic 260 via the presentation logic 250.

The storage logic 260 processes the received alert and meta-information (including results information provided by the mitigation logic 252. The storage logic 260 analyzes the alert and associated meta-information and determines if the action and/or classifications may be stored in memory 230. The determination, as to whether or not the meta-information may be stored in memory 230, may be based on the duplicative nature of the meta-information (i.e. determine if the same information is stored in the memory), modification of existing meta-information stored in the memory and/or if the meta-information to be stored is inconsistent with prior stored meta-information.

The reporting engine 254 receives the alert and associated meta-information for presentation to the analyst. The reporting engine may provide the alert and associated meta-information to the user interface 290 and/or to the network device(s) 220 for presentation to the analyst. The user interface 290 may produce a graphical or textual based representation to a user of the endpoint 10 device 200. The user interface 290 provides the user with the ability to interact with the computer. The user interface 290 may not be present for an endpoint device that is not dedicated to a single user or does not require the interaction with a user. The user interface 290 may receive input via the network device(s) 280 which include various input/output devices.

Figure 3:
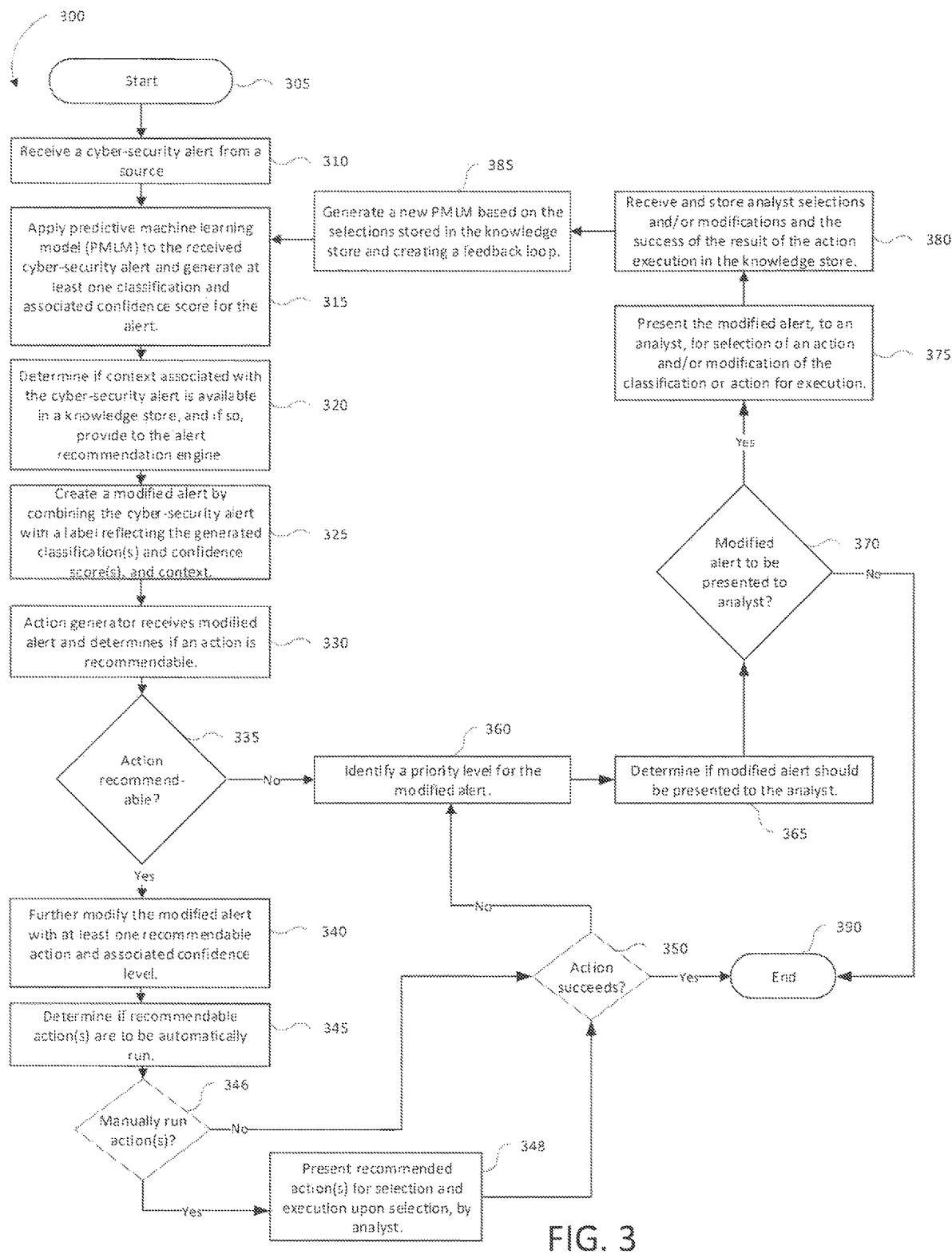
FIG. 3 is an exemplary flowchart of the operations of the automated analyst alerting system of FIGS. 1 and 2.

FIG. 3 represents an exemplary flowchart of a computerized method 300 for operating an automated analyst recommendation system 100. The exemplary method 300 starts at step 305 and proceeds to step 310 where the automated analyst recommendation system 100 receives an alert from cyber-security device(s) 102 transmitted over the communication network 105 via the network interface(s) 110. During step 310, the alert parser 120 processes the alert to generate processible meta-information for further analysis by subsequent analytics logics (e.g., the alert analysis and labeling engine 132, the action generator 134, etc.). Upon completion of processing by the alert parser 120, the alert and associated meta-information is provided to alert analysis and labeling engine 132 for further analysis in step 315.

The alert analysis and labeling engine 132, during step 315 applies the predictive machine learning model stored in the knowledge store 140, to the received alert and associated meta-information. The results of the analysis of the received alert and meta-information with the predictive model is at least one classification label and a confidence level (e.g., likelihood of association, etc.). In some embodiments the predictive model may also generate a set of alerts associated as meta-information with the received alert. The associated alerts may be relevant to the assessment of the received alert when reviewed by an analyst. If associated alerts are identified, the alert and associated meta-information is retrieved from the knowledge store 140 and added to the received alert's associated meta-information for further processing in step 320. In step 325 the meta-information and the received alert are associated and provided to the action generator 134 for further analysis.

In step 330 the action generator 134 receives the alert received by the automated analyst recommendation system 100 and associated meta-information for analysis. The analysis may include the processing of factory-set and/or user-defined rules. For example, an alert associated with a "phishing" email cyberattack may identify the source cyber-security device(s) 102 from the meta-information and generate an action targeting the phishing email for quarantine. In some embodiments a predictive action model may be applied to the received alert and meta-information to generate a set of recommended actions based on prior actions taken and/or recorded by the automated analyst recommendation system 100. If an action is generated in step 335, the method continues step 340 where the alert and its associated meta-information is modified with the generated action(s). Further processing by the action generator 134 may further determine if at least one of the generated action(s) should be automatically processed by the mitigation logic 170 in step 345. If the generated action is determined to be automatically run in step 350, and succeeds, the method ends at step 390. If the generated action is determined to be manually run in step 345, the generated action is presented to the analyst via the analyst interface 195 in step 348. Upon selection by the analyst, the analyst interface 195 provides the selection to the mitigation logic for execution and if in step 350 the executed action succeeds, the method ends at step 390.

If the action generator cannot identify a recommendable action in step 335 or the executed action fails in step 350, the presentation logic 160 determines a priority for presentation of the alert to the analyst in step 360. The determination of priority is based, at least in part, on the success of an action executed by the mitigation logic 170. In some embodiments, the priority for presentation of an alert to the analyst may be based on the confidence level associated with a classification of the alert. In some embodiments, the presentation logic 160 determines a priority level of an alert in step 360 then in step 365 determines if the alert, based in part on the priority level, should be presented to the analyst. If the presentation logic 160 determines that the alert need not be presented to the analyst in step 370, the method ends at step 390.

If the alert is determined to be presented to the analyst in step 370 by the presentation logic 160, the alert is presented to the analyst for further interaction. In some embodiments the further interaction with the analyst may be done through a user interface 290 or via the reporting engine 190 once the alert has been further processed by the storage logic 180. In step 375 the analyst is presented with the modified alert. The analyst may select an action associated with the modified alert, modify a classification of the modified alert, and/or generate an action or classification associated with the alert based on the context received. The result of step 375 is provided to the knowledge store via the storage logic 180 in step 380. In step 380, upon receipt of a new and/or modified alert and/or action result, the storage logic 180 may store the received information in the knowledge store 140. If information received by the knowledge store in step 380, the alert analysis and labeling engine 132 may regenerate a new predictive model based on the new information and re-analyze the received alert in step 385. By this method, the system will identify alerts requiring additional action by an analyst while minimizing the time spent by analysts on low value alerts.

The foregoing description has been directed to specific embodiments. It will be apparent, however, that other variations and modifications may be made to the described embodiments, with the attainment of some or all their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly, this description is to be taken only by way of example and not to otherwise limit the scope of the embodiments herein. Therefore, it is the object of the appended claims to cover all such variations and modifications as come within the true spirit and scope of the invention.

What is claimed is:

1. A computer-implemented method to perform self-learning for a predictive machine learning model of a cyber-security alert system, the method comprising:
   obtaining, by a computing system, the predictive machine learning model, the predictive machine learning model trained based on data in a knowledge store;
   receiving, by the computing system, an alert associated with a monitored network;
   classifying, by the computing system, the received alert according to the predictive machine learning model to generate at least one alert classification;
   automatically generating, by the computing system, a one or more recommended actions responsive to, and associated with, the received alert based on the alert classification;
   automatically causing, by the computing system, execution of the one or more recommended actions;
   updating, by the computing system, the knowledge store to include a result of the one or more recommended actions in the knowledge store; and
   generating an updated predictive machine learning model based on the updated knowledge store.

2. The computer-implemented method of claim 1, wherein the result indicates a success or failure of the one or more recommended actions.

3. The computer-implemented method of claim 1, further comprising surfacing, by the computing system, the at least one alert classification or the one or more recommended actions for modification by an analyst.

4. The computer-implemented method of claim 3, wherein said surfacing is performed in response to the result of the one or more recommended actions indicating a failure of the one or more recommended actions.

5. The computer-implemented method of claim 3, further comprising, prior to generating the updated predictive machine learning model: updating the knowledge store based on a modification entered by the analyst.

6. The computer-implemented method of claim 1, wherein the predictive machine learning model comprises an artificial neural network.

7. The computer-implemented method of claim 1, wherein the predictive machine learning model generates a confidence score for the at least one alert classification and wherein automatically causing, by the computing system, execution of the one or more recommended actions occurs in response to the confidence score exceeding a confidence threshold.

8. The computer-implemented method of claim 1, wherein the one or more recommended actions comprise communication with a conventional external computing device that is configured to effectuate the one or more recommended actions.

9. The computer-implemented method of claim 8, wherein said communication occurs via an Application Programming Interface (API) call.

10. A computing system configured to perform a self-learning loop for a predictive machine learning model of a cyber-security alert system, the computing system comprising:
    one or more processors; and
    one or more non-transitory computer-readable media that collectively store:
        a knowledge store;
        a predictive machine learning model; and instructions that, when executed by the one or more processors cause the computing system to perform operations, the operations comprising:
- obtaining, by the computing system, the predictive machine learning model, the predictive machine learning model trained based on data in the knowledge store;
- receiving, by the computing system, an alert associated with a monitored network;
- classifying, by the computing system, the received alert according to the predictive machine learning model to generate at least one alert classification;
- automatically generating, by the computing system, a one or more recommended actions responsive to, and associated with, the received alert based on the alert classification;
- automatically causing, by the computing system, execution of the one or more recommended actions;
- updating, by the computing system, the knowledge store to include a result of the one or more recommended actions in the knowledge store; and
- generating an updated predictive machine learning model based on the updated knowledge store.

11. The computing system of claim 10, wherein the result indicates a success or failure of the one or more recommended actions.

12. The computing system of claim 10, further comprising surfacing, by the computing system, the at least one alert classification or the one or more recommended actions for modification by an analyst.

13. The computing system of claim 12, wherein said surfacing is performed in response to the result of the one or more recommended actions indicating a failure of the one or more recommended actions.

14. The computing system of claim 12, further comprising, prior to generating the updated predictive machine learning model: updating the knowledge store based on a modification entered by the analyst.

15. The computing system of claim 10, wherein the predictive machine learning model comprises an artificial neural network.

16. The computing system of claim 10, wherein the predictive machine learning model generates a confidence score for the at least one alert classification and wherein automatically causing, by the computing system, execution of the one or more recommended actions occurs in response to the confidence score exceeding a confidence threshold.

17. The computing system of claim 10, wherein the one or more recommended actions comprise communication with a conventional external computing device that is configured to effectuate the one or more recommended actions.

18. The computing system of claim 17, wherein said communication occurs via an Application Programming Interface (API) call.

19. The computing system of claim 10, wherein the operations further comprise employing the updated predictive machine learning model to process a new alert.

20. One or more non-transitory computer-readable media that collectively store:
- a knowledge store;
- a predictive machine learning model; and
- instructions that, when executed by one or more processors of a computing system cause the computing system to perform operations, the operations comprising:
  - obtaining, by the computing system, the predictive machine learning model, the predictive machine learning model trained based on data in the knowledge store;
  - receiving, by the computing system, an alert associated with a monitored network;
  - classifying, by the computing system, the received alert to generate at least one alert classification;
  - automatically generating, by the computing system and using the predictive machine learning model, one or more recommended actions responsive to, and associated with, the received alert based on the alert classification;
  - automatically causing, by the computing system, execution of the one or more recommended actions;
  - updating, by the computing system, the knowledge store to include a result of the one or more recommended actions in the knowledge store; and
  - generating an updated predictive machine learning model based on the updated knowledge store.

* * * * *